United States Patent [19]

Kohda

[11] Patent Number: 5,621,879
[45] Date of Patent: Apr. 15, 1997

[54] WINDOW MANAGEMENT INFORMATION INPUT/OUTPUT SYSTEM

[75] Inventor: Youji Kohda, Kawasaki, Japan

[73] Assignee: Fujitsu Limited, Kawasaki, Japan

[21] Appl. No.: 654,004

[22] Filed: May 28, 1996

Related U.S. Application Data

[63] Continuation of Ser. No. 267,214, Jul. 6, 1994, abandoned, which is a continuation of Ser. No. 954,049, Sep. 30, 1992, abandoned.

[30] Foreign Application Priority Data

Sep. 30, 1991 [JP] Japan .................... 3-250027

[51] Int. Cl.$^6$ .................................. G06F 15/00
[52] U.S. Cl. .................................. 395/340
[58] Field of Search .................... 395/155, 157

[56] References Cited

U.S. PATENT DOCUMENTS

| | | | |
|---|---|---|---|
| 4,574,364 | 3/1986 | Tabata et al. | 364/900 |
| 4,794,386 | 12/1988 | Bedarij et al. | 395/157 |
| 4,829,294 | 5/1989 | Iwami et al. | 395/157 |
| 5,119,476 | 6/1992 | Texier | 395/157 |
| 5,179,654 | 1/1993 | Richards et al. | 395/157 |
| 5,179,655 | 1/1993 | Noguchi et al. | 395/158 |
| 5,227,771 | 7/1993 | Kerr et al. | 395/157 |

OTHER PUBLICATIONS

Hypercard User's Guide; Apple Computer, Inc. 1988, pp. 1–195.

Primary Examiner—Mark R. Powell
Assistant Examiner—Huynh Ba
Attorney, Agent, or Firm—Staas & Halsey

[57] ABSTRACT

The present invention is a data processing unit capable of displaying a window on the display screen, and aims at being able to refer to and update window management information, that is, information indicating the size and the position of the window, etc. in a representation format comprehensible for a user. It comprises a window selecting unit for selecting a window corresponding to the window management information to be accessed by the user, a window-management-information-providing unit for inputting to and outputting from the display the management information in the format comprehensible for the user, a window-management-information-reading unit for reading the management information for the selected window from the window system, converting the representation format of the information, and outputting the result to the window-management-information-providing unit, and a window-management-information-writing unit for converting the management information converted on the display screen using, for example, a keyboard, and outputted by the window-management-information-providing unit back to the original representation format, and for outputting the result to the window system.

20 Claims, 16 Drawing Sheets

AT ACTIVATION

AFTER SELECTING WINDOW

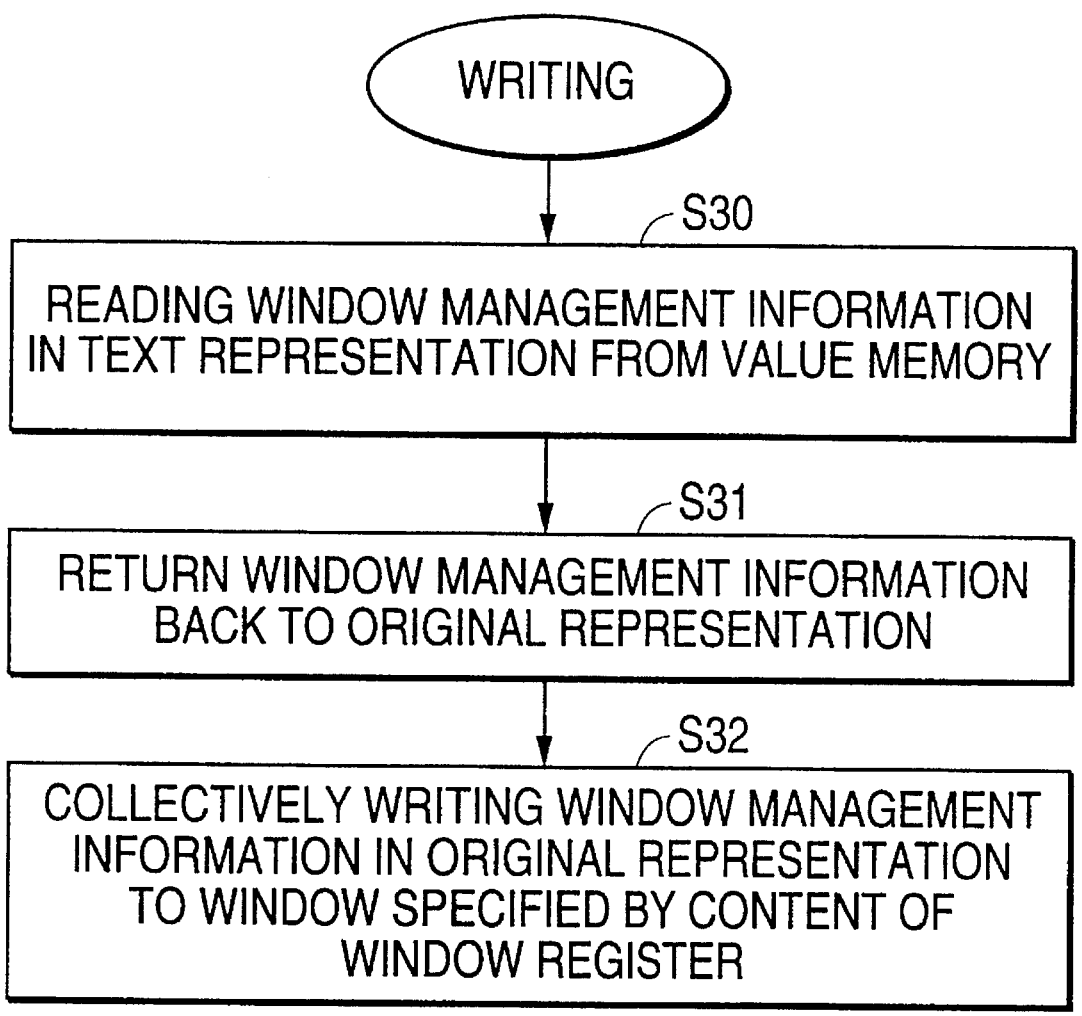

FIG. 13A

| 23 | | |
|---|---|---|
| SIZE | 232 x 462 | |
| POSITION OF ORIGIN | 100, 50 | |
| TITLE | PROGRAM B | |
| OTHERS : 1 | | |
| OTHERS : 2 | .... | |

FIG. 13B

| 23 | | |
|---|---|---|
| SIZE | 400 x 462 | |
| POSITION OF ORIGIN | 20, 20 | |
| TITLE | PROGRAM B | |
| OTHERS : 1 | | |
| OTHERS : 2 | .... | |

FIG. 17A

| FIELD NAME | FIELD VALUE |
|---|---|
| " < POSITION OF WINDOW > " | (300,200)<LINE FEED> |
| " < SIZE OF WINDOW > " | 500x400 <LINE FEED> |
| ⋮ | |

FIG. 17B

```
Id ◄──────Start RV                                                    ·····(1)
Control RV Id   "Select < WINDOW NAME >"                              ·····(2)
Control RV Id   "Get"                                                 ·····(3)
Control RV Id   "Output" | < FILTER PROGRAM > | Control Rv Id "Input" ·····(4)
Control RV Id   "Put"                                                 ·····(5)
```

[IN (4), | INSTRUCTS TO CONNECT STANDARD OUTPUT OF LEFT COMMAND TO STANDARD INPUT OF RIGHT COMMAND, REPRESENTATION MUST BE DONE ACCORDING TO UNIX OPERATING SYSTEM.]

FIG. 17C

EXAMPLE OF FILTER PROGRAM

THE FILE IN THE FORMAT A IS READ FROM THE STANDARD INPUT, THE LINE WHOSE FIELD NAME IS <POSITION OF WINDOW> IS LOCATED, AND ITS FIELD VALUE IS DETERMINED TO BE (x, y). THEN, x + 100 AND y + 100 ARE CALCULATED (RESULTS ARE x' AND y' RESPECTIVELY). IN PLACE OF THE LINE, <POSITION OF WINDOW> (x', y')
<LINE FEED> IS WRITTEN TO THE STANDARD OUTPUT. THE OTHER LINES WHOSE FIELD NAMES ARE NOT <POSITION OF WINDOW> ARE WRITTEN TO THE STANDARD OUTPUT AS IS.

ns and personal computers. Thus, in
WINDOW MANAGEMENT INFORMATION INPUT/OUTPUT SYSTEM This application is a continuation of application Ser. No. 08/267,214, filed Jul. 6, 1994, now abandoned, which application is a continuation of application Ser. No. 07/954,049, filed Sep. 30, 1992, now abandoned.

BACKGROUND OF THE INVENTION

The present invention relates to a data processing unit capable of displaying a window on a display screen, and more specifically to a window management information input/output system capable of referring to and updating the window management information such as window size, display position, etc. in a representation format comprehensible for a user.

A window is a virtual display unit to be provided as many as required on a physical display unit. A window display unit is an indispensable part of user interfacing technology for the latest workstations and personal computers. Thus, in pursuit of more advanced user interfacing technology, the improvement of the window display unit should be of great value.

The reason for referring to a window as a virtual display is explained below. At first, a window was used mostly as a substitute terminal for displaying 80 characters×25 lines. Therefore, the window is a virtually simulated character terminal and referred to as a virtual display unit. Specifically, the word "virtual" is used to emphasize the simulation of a conventional display unit.

Hereafter, a window also refers to a window group comprising a plurality of windows, and a user refers to a person who uses a window display unit, or a program which communicates with the window display unit.

The conventional window display units are equipped with a window manager for collectively managing all windows. The window manager collectively manages window management information associated with each window. The window management information contains, for example, window-size, window position, etc.

Conventionally, the window management information has been managed exclusively by the window manager in a format easily processed by it, and was not open to users. Therefore, there was a problem that a user could not use the windows without obtaining permission from the window manager.

SUMMARY OF THE INVENTION

The present invention aims at being able to refer to window management information in a format comprehensible for a user and at being easily able to modify the window management information.

A feature of the present invention resides in a window management information input/output system used in a data processing unit having the function of displaying on the screen a window controlled by a window system, the unit comprising window selecting unit for selecting a window corresponding to window management information to be accessed from a user, window-management-information-providing unit for inputting to and outputting from the display window management information in a representation format comprehensible for a user, window-management-information-reading unit for reading window management information for the window system selected by the window selecting unit, converting the representation format of the management information to that of the window-management-information-providing unit, and outputting the result to the window-management-information-providing unit, and window-management-information-writing unit for converting the window management information outputted from the window-management-information-providing unit to the original representation format in the window system, and outputting the result to the window system as window management information for the selected window.

BRIEF DESCRIPTION OF THE DRAWINGS

One skilled in the art can easily understand additional features and objects of this invention from the description of the preferred embodiments and some of the attached drawings. In the drawings:

FIG. 10 is a detailed flowchart for explaining the writing process;

FIGS. 13A and 13B show embodiments to explain the value display box;

FIGS. 17A, 17B and 17C are views for explaining an example of using the window management information input/output system through a program.

DESCRIPTION OF THE PREFERRED EMBODIMENT

Figure 1:
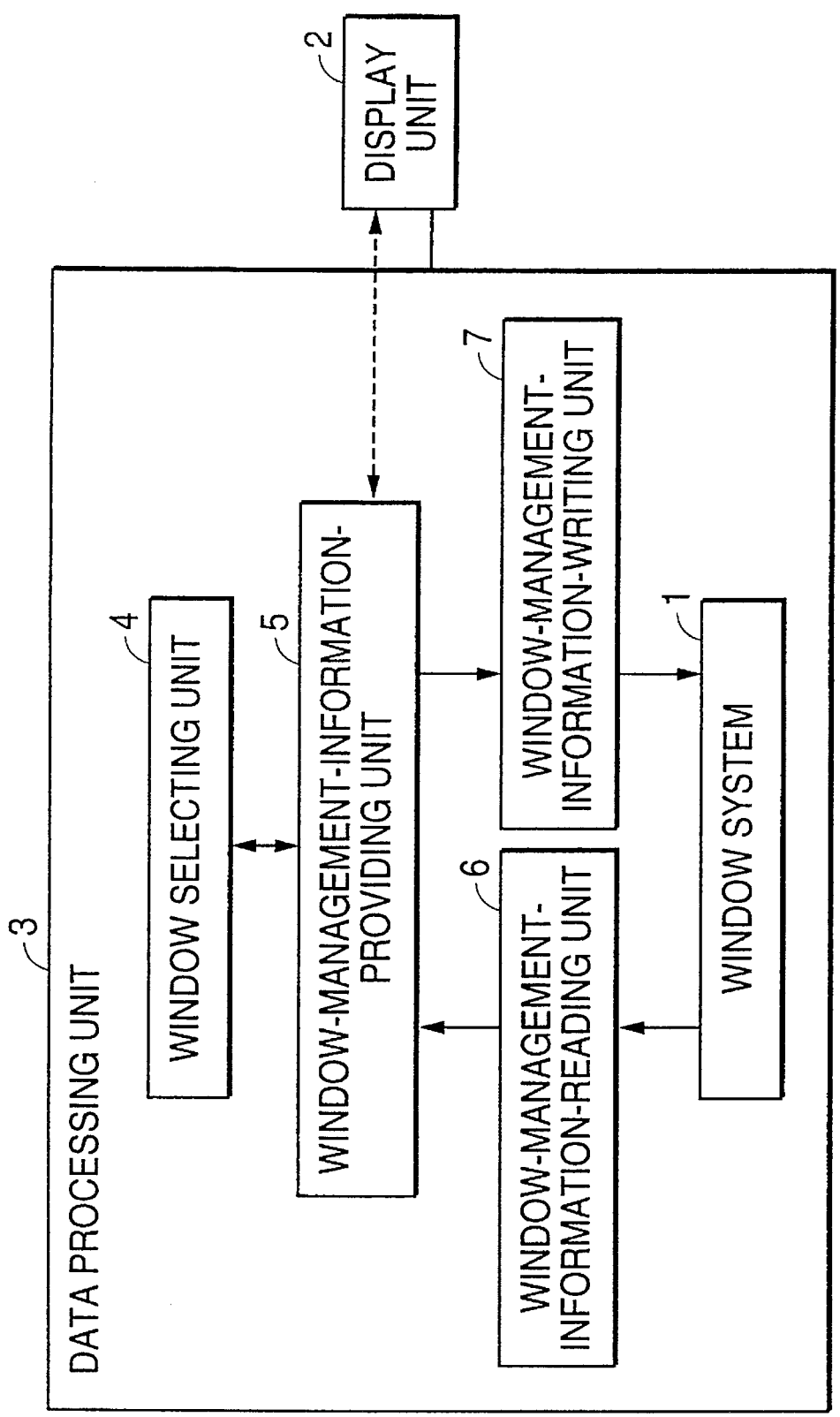
FIG. 1 is a block diagram for explaining the principle of the present invention.

FIG. 1 is a block diagram for explaining the principle of the present invention, and more specifically for explaining the principle of the window management information input/ output system used in a data processing unit 3 capable of displaying on a display 2 a window controlled by a window system 1.

In FIG. 1, a window selecting unit 4 refers to a window selecting portion, and selects a window corresponding to the window management information to be accessed by a user (including a program in another data processing unit). A window-management-information-providing unit 5 refers to a window-management-information-providing portion, and inputs from and outputs to the display unit 2 the window management information formatted in a representation comprehensible for the user. The window-management- information-providing unit 5 comprises, for example, a window-management-information-storing unit for temporarily storing the window management information, and an input/ output unit for inputting from and outputting to a display the window management information.

A window-management-information-reading unit 6 refers to a window-management-information-reading portion. It reads from the window system 1 the window management information for the window selected by the window selecting unit 4, modifies the representation format of the window management information into the format which can be processed by the window-management-information-providing unit 5, and outputs the result to the window-management-information-providing unit 5. A window-management-information-writing unit 7 converts the format of the window management information received from the window-management-information-providing unit 5 to the representation format which can be processed by the window system, and outputs the result to the window system 1 as the window management information for the window selected by the window selecting unit 4. The window-management-information-reading unit 6 and the window-management-information-writing unit 7 comprise, for example, a representation-format-converting unit for converting the representation format of the window management information between that for the window system 1 and that for the window-management-information-providing unit 5.

In the present invention, window management information is referred to in a format comprehensible for a user, and can be modified if necessary. The window management information is the attribute information, for example, window size, display position, background color, etc.

In the present invention, instructions to select a window, read or write window management information, etc. are issued by a user in the display and input/output box for the window management information on the screen. The display and input/output box contains an operational instruction box in which the user selects a window, etc. and a value display box for displaying the values of the window management information.

In the present invention, the window management information input/output system displays the display and input/output box on the display screen when the window management information input/output system is activated. For the user to refer to or modify the window management information displayed in the window, the window selecting unit 4, for example, selects a window according to the operational instruction through a mouse, for example.

Next, when the user issues a read instruction through the operational instruction box, the window-management-information-reading unit 6 is activated, and the window management information for the selected window is read from the window system 1. The window management information is converted to character text format by, for example, the representation-format-converting unit and transmitted to the window-management-information-providing unit 5.

The window-management-information-providing unit 5 stores the formatted information in the window-management-information-storing unit, for example, and displays the value of the window management information in the value display box.

The value in the value display box can be modified on the screen by the user's keyboard operation. The modified value is reflected in the window-management-information-storing unit.

When the user issues an instruction to write the information through the instructions displayed in the operational instruction box, after modifying the value, the window-management-information-writing unit 7 is activated. The window-management-information-writing unit 7 converts the contents of the window-management-information-storing unit into the internal format managed by the window system 1 by the representation-format-converting unit, and writes the result to the window system 1.

After the writing operation, the window management information for the selected window is updated, and the window is controlled and displayed according to the new window management information.

As described above, the window-management-information-providing unit 5 enables displaying the window management information in a representation format comprehensible for users. Furthermore, the window management information can be safely inputted from or outputted to the window system with consistency in the window management information guaranteed by collectively reading or writing the window management information as described later.

Figure 2:
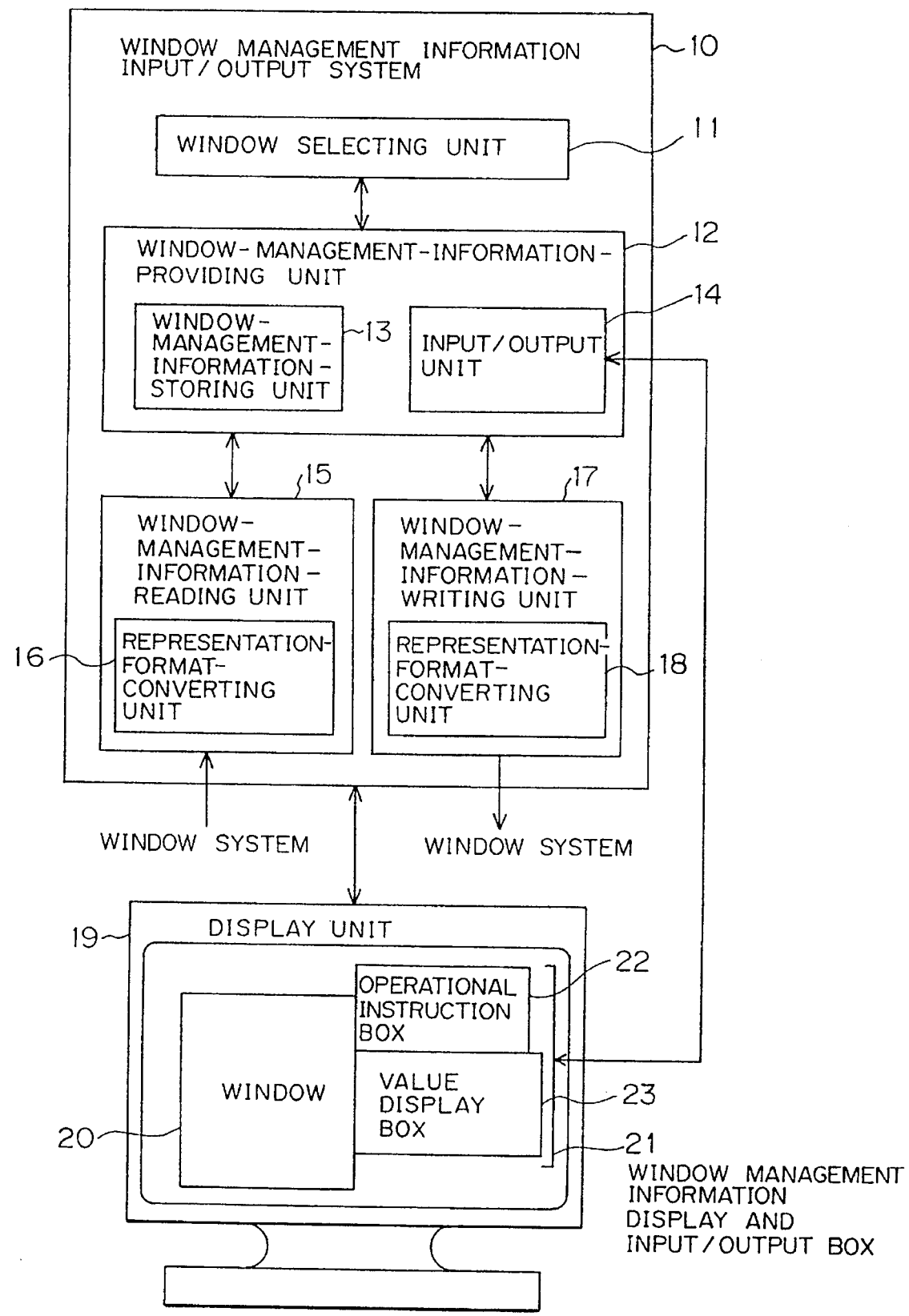
FIG. 2 is a block diagram for explaining the basic configuration of the window management information input/output system of the present invention.

FIG. 2 is a block diagram for explaining the basic configuration of the window management information input/ output system of the present invention.

In FIG. 2, 10 is a window management information input/output system applied to the present invention; a window selecting unit 11 selects a target window; a window-management-information-providing unit 12 visualizes window management information and presents it to a user; a window-management-information-storing unit 13 stores the window management information of a target window; an input/output unit 14 inputs/outputs the window management information and the operational instruction information; a window-management-information-reading unit 15 reads the window management information from the window system 1; a representation-format-converting unit 16 converts the representation format of the window management information; a window-management-information-writing unit 17 writes the window management information to the window system 1; a representation-format-converting unit 18 returns the representation format of the window management information back to the original format; a display unit 19 displays a window; a window 20 is a display box logically segmented as a virtual display; a window management information display and input/output box 21 inputs and outputs the window management information; an operational instruction box 22 displays an operational instruction from a user for the window management information; and a value display box 23 displays inputted/outputted values of the window management information.

Although this does not directly relate to the present invention, the above described window as a virtual display can be referred to as a general purpose information display and input/output box when it is functionally recognized. It is also referred to as a window management information display and input/output.

A window selecting unit 11 selects a target window 20 for modification based on window management information. The window management information contains attributes required to display the window 20, for example, the size of the window 20, the display position, the background color, etc.

The window-management-information-providing unit 12 displays the window management information display and input/output box 21, and inputs/outputs the window management information in a representation format comprehensible for a user through the input/output unit 14.

The window-management-information-reading unit 15 reads the window management information for the window selected by the window selecting unit 11, converts the representation format of the information to the format which can be processed by the window-management-information-providing unit 12 through the representation-format-converting unit 16, and then transmits the result to the window-management-information-providing unit 12. The window-management-information-providing unit 12 stores the received window management information in the window-management-information-storing unit 13.

The window-management-information-writing unit 17 receives from the window-management-information-providing unit 12 the window management information stored in the window-management-information-storing unit 13, returns it back to the original representation format through the representation-format-converting unit 18, and writes the result as the management information for the window selected by the window selecting unit 11.

The window-management-information-providing unit 12 inputs/outputs the window management information through the window management information display and input/output box 21 displayed near the target window 20. The window management information display and input/output box 21 comprises, for example, an operational instruction box 22 to accept an operational instruction and a value display box 23 for displaying various attribute values of the window management information.

The window-management-information-reading unit 15 or the window-management-information-writing unit 17 is configured such that all values of the window management information are collectively moved between the selected window managed by the window system and the window-management-information-providing unit 12. This is explained later.

Figure 3:
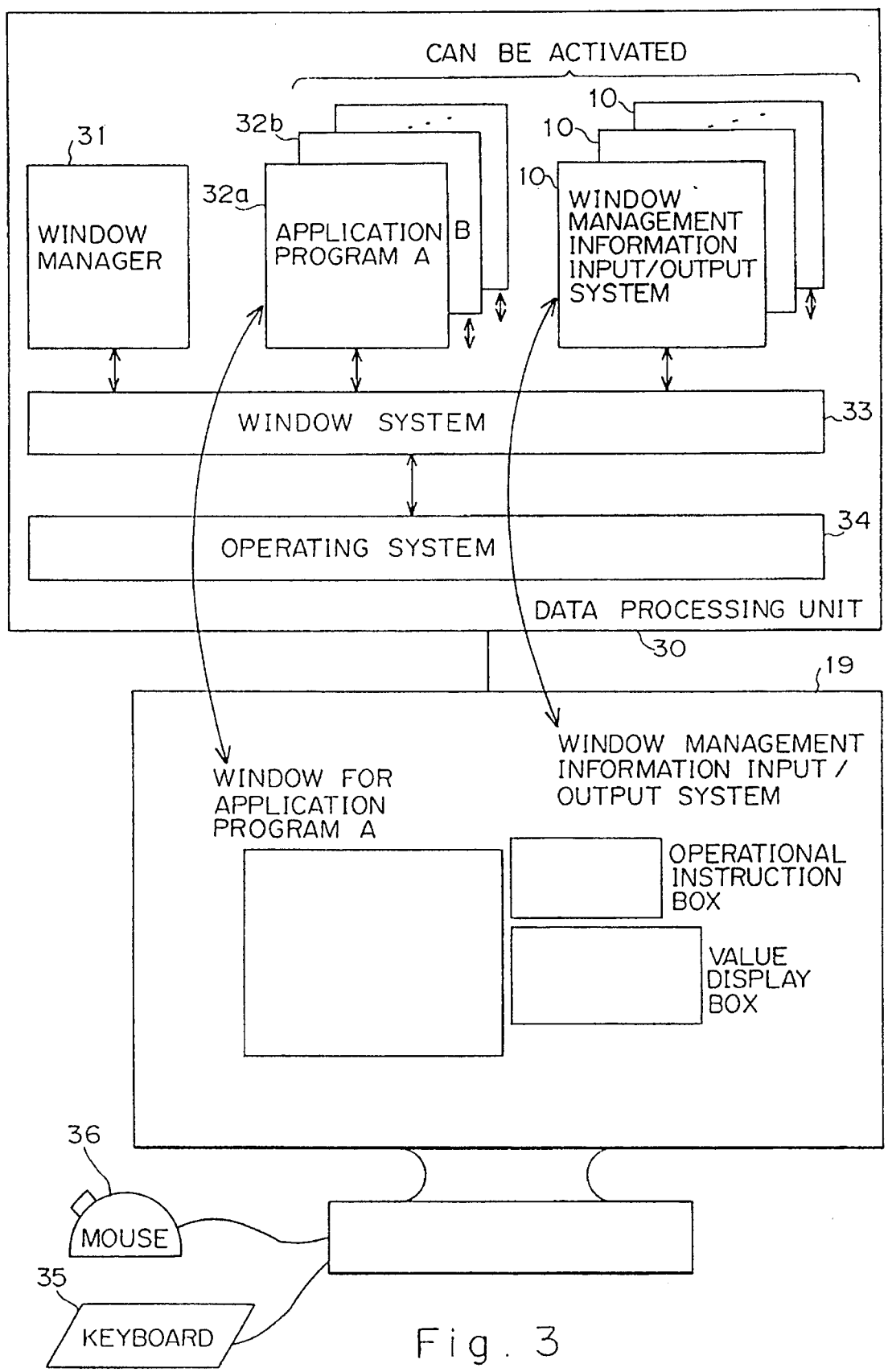
FIG. 3 is a block diagram for explaining the system configuration of the data processing unit containing the window management information input/output system of the present invention.

FIG. 3 is a block diagram for explaining the system configuration of the data processing unit including the window management information input/output device.

In FIG. 3, a data processing unit 30 comprises a CPU, a memory, etc.; a window manager 31 collectively manages window management information; 32a and 32b are application programs; a window system 33 displays and controls a window; 34 is an operating system; 35 is a keyboard; and 36 is a mouse.

FIG. 3 shows an example of a window of application program A opened on the screen of the display 19. The window is provided with the window management information display and input/output box containing an operational instruction box and a(n) (information) value display box corresponding to one window management information input/output system 10.

Figure 4:
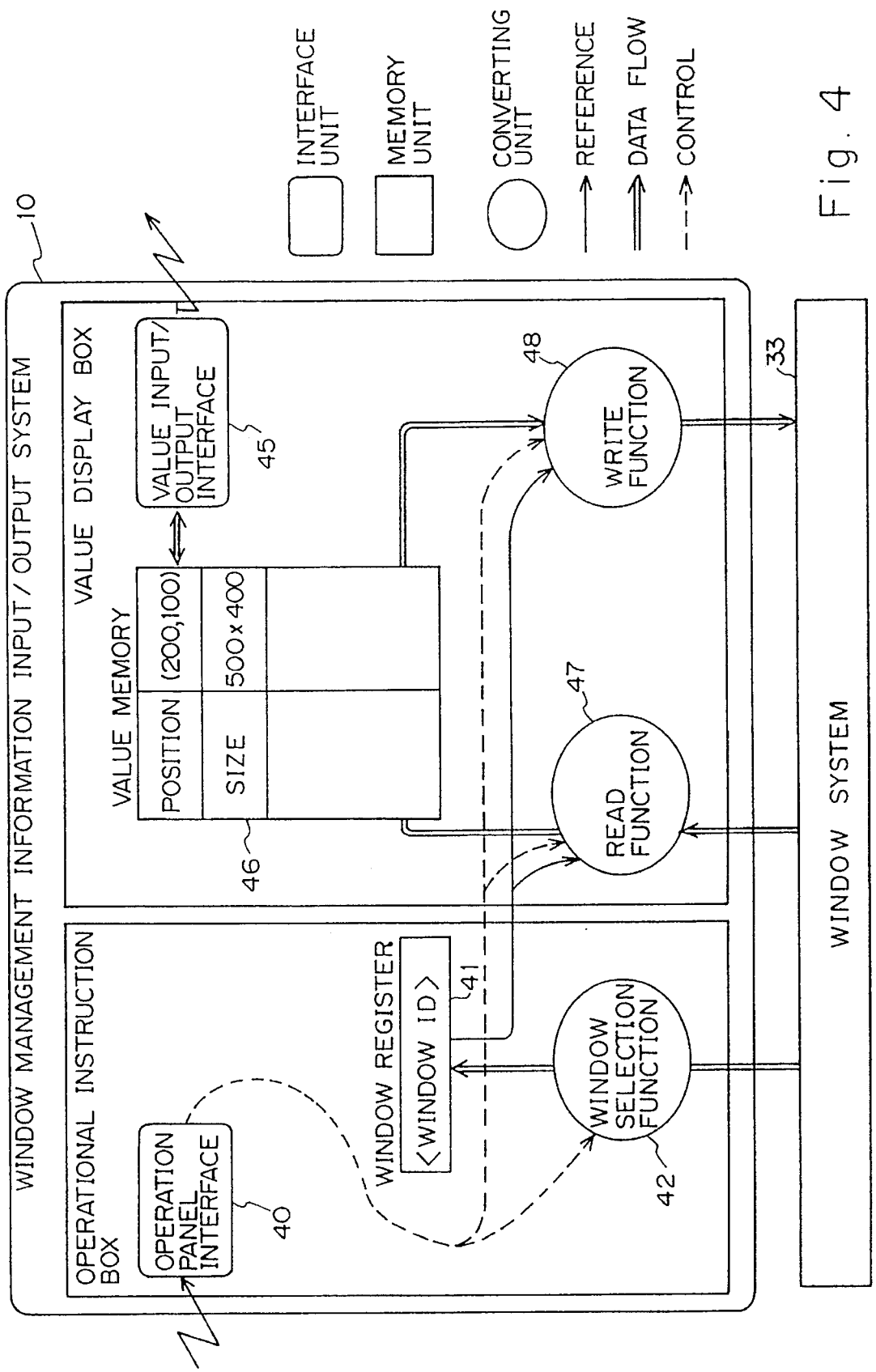
FIG. 4 is a block diagram for explaining the detailed configuration of the window management information input/output system.

In FIG. 3, since the window system 33 and the window manager 31 are well known, the explanation for them is omitted here. FIG. 4 shows the detailed configuration of one of the window management information input/output systems 10 shown in FIG. 3.

In FIG. 4, the window management information display and input/output unit 10 is divided into two portions. One portion corresponds to the operational instruction box displayed on the screen of the display 19. When a user issues an instruction to select a window through the operational instruction box, it accepts the instruction at an operation panel interface 40, stores at a window register 41 an identifier of a window selected by the user which is supplied by a window selecting unit 42, accessing the window system 33.

The other portion corresponding to the (information) value display box comprises a value input/output interface 45 for displaying a management information value in the (information) value display box, a value memory 46 for storing a management information value, a reading unit 47 for reading window management information from the window system 33 according to the window identifier stored in the above described window register 41, and a writing unit 48 for writing the contents in the value memory 46 to the window system 33.

Conventionally, a user can operate windows 20a and 20b only through the window manager 31. In contrast, with the present invention the user can easily operate windows 20a and 20b through the window management information input/output system 10.

The window management information input/output system 10 enables a user to directly operate, using a mouse or a keyboard, the window management information in window 20, for example, through the operational instruction 22 and the value display box 23.

Figure 5A:
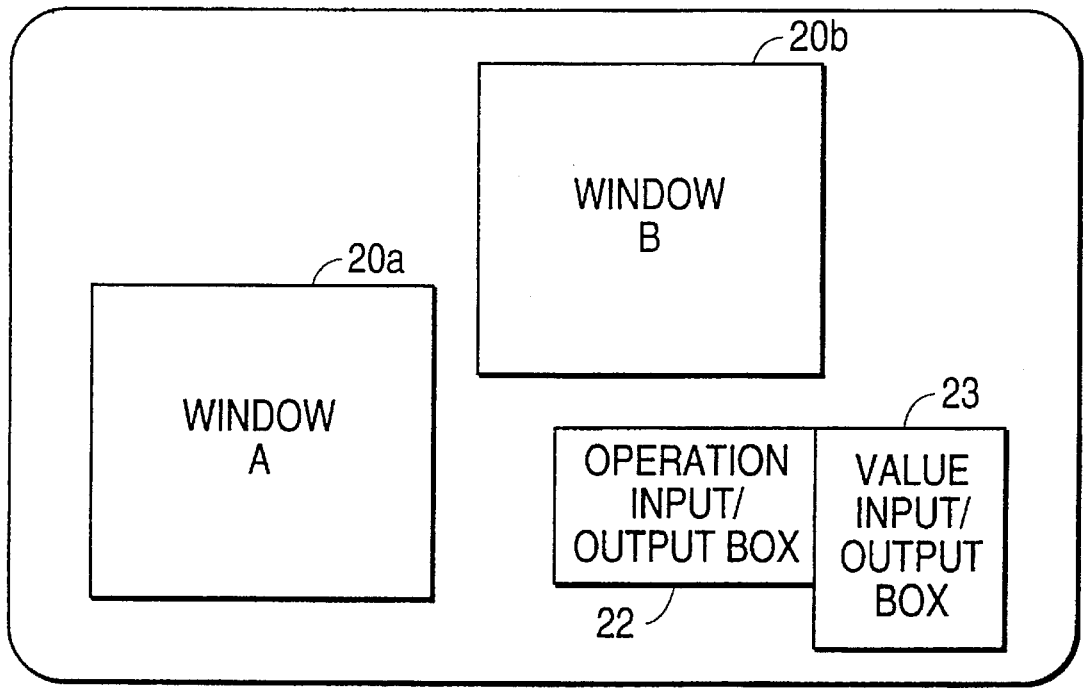
FIGS. 5A and 5B show display samples.
Figure 5B:
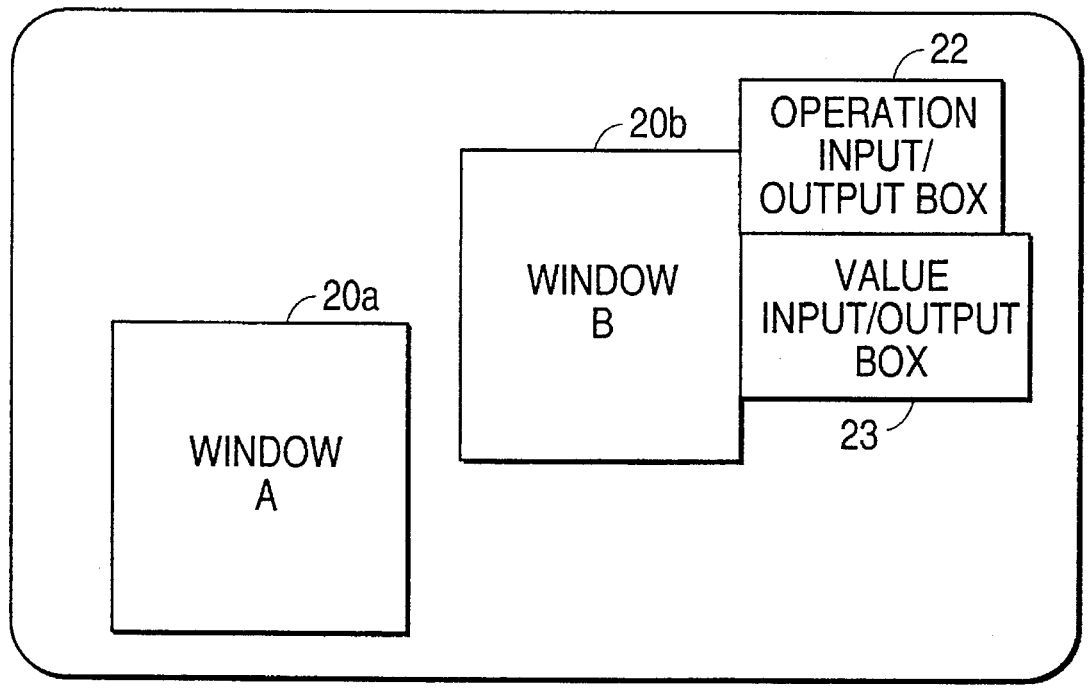

FIGS. 5A and 5B show examples of displays according to the present invention.

When the window management information input/output system 10 is activated, the operational instruction box 22 and the value display box 23 are displayed as shown in FIG. 5A. The operational instruction 22 and the value display box 23 are moved as shown in FIG. 5B when, for example, the operational instruction box 22 specifies window 20b, to be displayed near window 20b.

Figure 6:
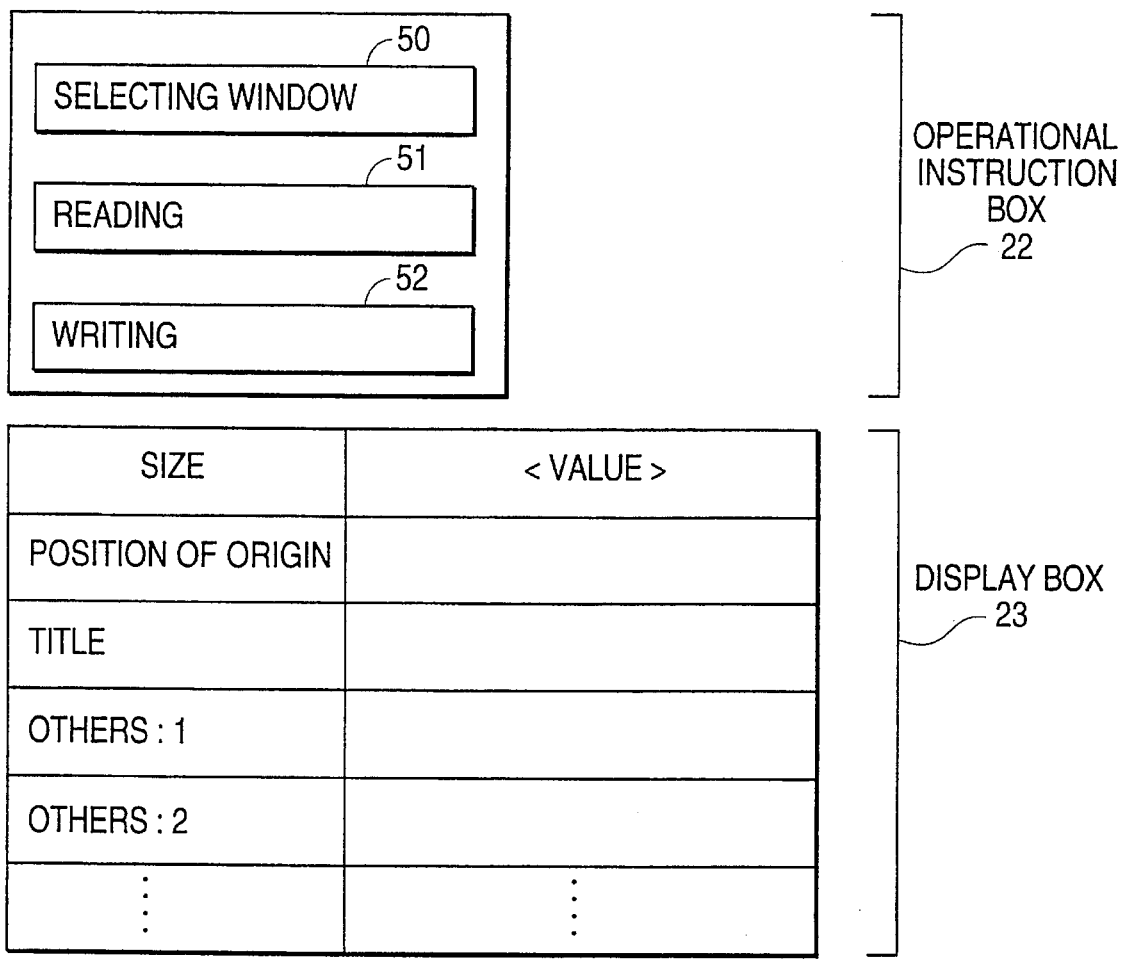
FIG. 6 shows an embodiment of the window management information display and input/output box.

FIG. 6 shows an example of the window management information display and input/output box in the embodiment of the present invention.

The window management information display and input/output box comprises the operational instruction box 22 and the value display box 23, and the operational instruction box 22 is provided with an operation button to be operated in processing the window management information. The operation button is operated by clicking the mouse 36.

A window selection button 50 selects a target window. A read button 51 specifies reading window management information. A write button 52 specifies writing window management information.

The value display box 23 displays the value of the window management information frequently read and written, for example, the size, the position of the origin, and the title of the window, and other attributes. Necessary fields depend on the window system adopted or the window manager.

Operating the window selection button 50 by clicking the mouse 36 changes the shape of the mouse cursor, thereby selecting the specified window. After selecting the window, the read button 51 is operated and the window management information for the selected window is collectively read. Thus, the information is converted to a representation format such as character text, etc., and the converted value is displayed in the value display box 23.

If the write button 52 is operated after selecting a window, the value in the value display box 23 is collectively converted from the text representation to the original internal representation, and is written back to the specified window. Thus, the specified window is actually moved or its size-changed according to the new value written back.

The value in the value display box 23 can be rewritten by a user through the keyboard 35, and can be modified by performing on the existing texts a cut-and-paste operation which is one of the services provided by the window manager 31.

Figure 7:
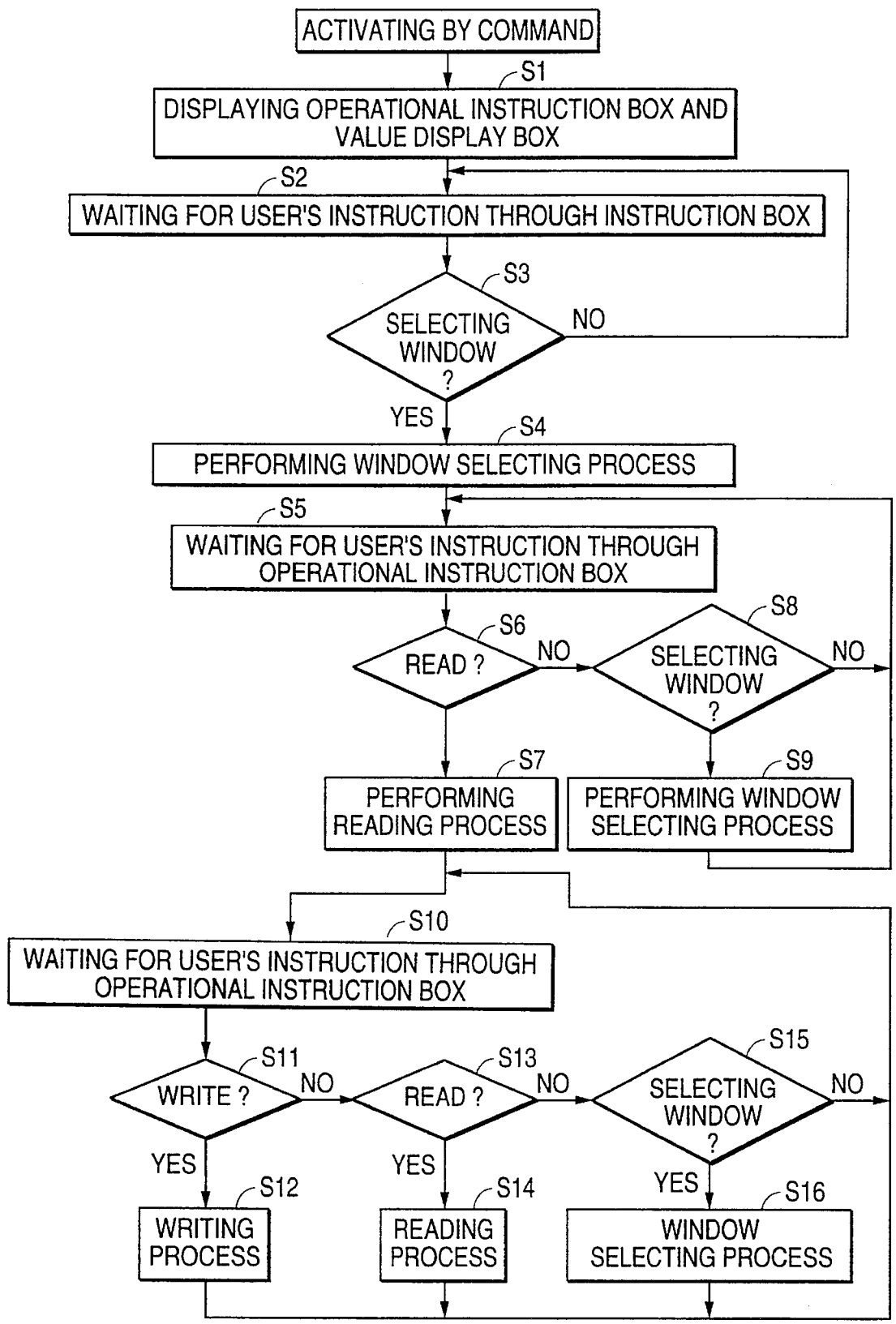
FIG. 7 is a complete flowchart for explaining an embodiment of the window management information input/output process.

FIG. 7 is a complete flowchart for explaining the window management information input/output process of the present invention. In FIG. 7, when the window management information input/output system is activated by a command, the window management information display and input/output box comprising the operational instruction box and the original form of the (information) value display box, that is, a vacant box without a value for the management information in step S 1. Then, in step S 2, an instruction from a user is expected in the operational instruction box. In step S 3, determination is made as to whether or not the instruction refers to selecting a window. At the initial state where no windows are selected, only a window selecting operation is valid as an instruction through the operational instruction box shown in FIG. 6. Therefore, the processes from step S 2 are repeated if the window selecting operation is not specified.

Figure 8:
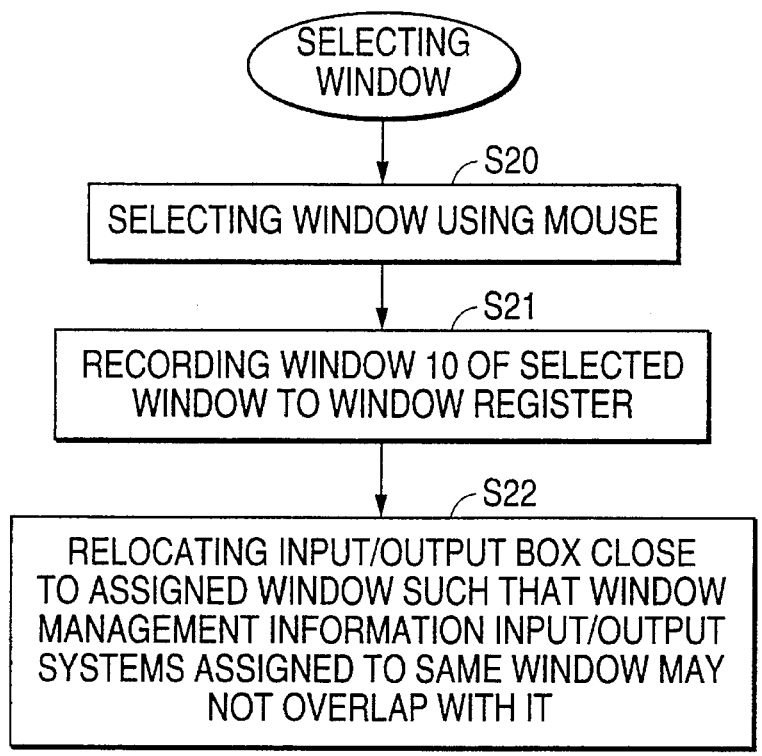
FIG. 8 is a detailed flowchart for explaining the window selecting process.
Figure 9:
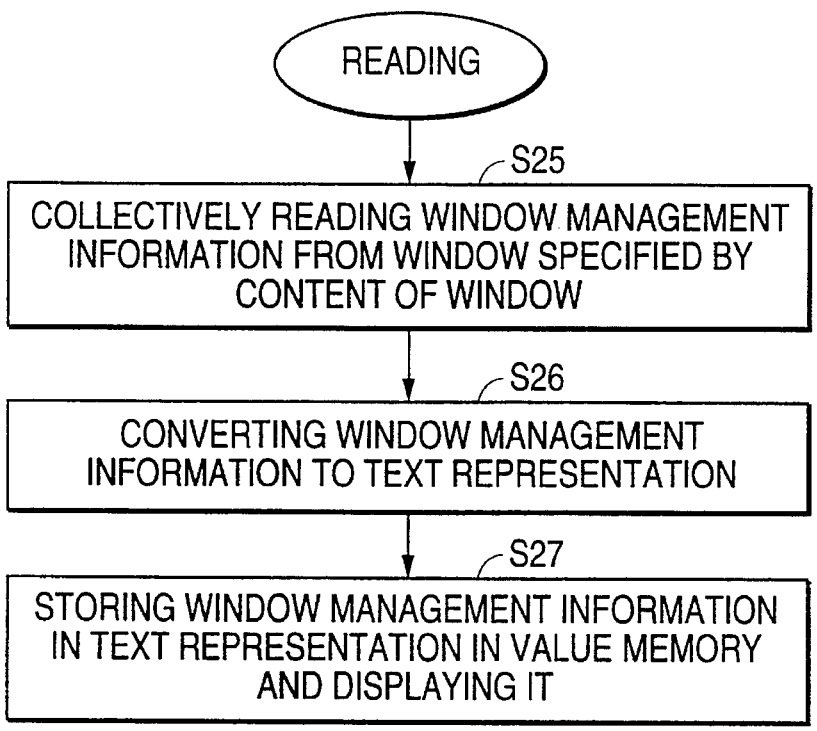
FIG. 9 is a detailed flowchart for explaining the reading process.

If the window selecting operation is specified, the window selecting process is performed in step S 4 as shown in detail in FIG. 8. In step S 5, an instruction from the user is expected again through the operational instruction box. If an instruction from the user is received, determination is made as to whether or not the instruction specifies a read in step S 6. If yes, reading process is performed as shown in FIG. 9 in step S 7.

If the instruction does not specify a read in step S 6, determination is made in step S 8 as to whether or not it specifies selecting a window. If yes, a window selecting process is performed in S 9, and the processes from S 5 are repeated. If not, the processes from S 5 are repeated only.

If a reading process is performed in step S 7, an instruction from the user is expected through the operational instruction box in step S 10. If it is received, determination is made as to whether or not it specifies a write in step S 11. If yes, a writing process is performed in step S 12 as shown in FIG. 10, and the processes from step S 10 are repeated.

If the instruction does not specify a write in step S 11, determination is made as to whether or not it specifies a read in step S 13. If yes, a reading process is performed in step S 14 and the processes from step S 10 are repeated. If the instruction does not specify a read in step S 13, determination is made as to whether or not the instruction specifies selecting a window in step S 15. If yes, a window selecting process is performed in step S 16, and then the processes from step S 10 are repeated. If not, the processes from step S 10 are repeated only.

FIG. 8 is a detailed flowchart for explaining the window selecting process. When the window selecting process starts as shown in FIG. 8, the user is expected to select a window using a mouse, etc. in step S 20. In step S 21, the identifier of the window selected in step S 21 is recorded by a window register 41 shown in FIG. 4. In step S 22, the window management information display and input/output box is relocated to a position close to the selected window. At this time, the relocation is performed such that the relocated box does not overlap with the display and input/output box of another window management information input/output system.

FIG. 9 is a detailed flowchart for explaining the reading process. When the process is started as shown in FIG. 9, the management information about the window referred to by the window identifier as the content of the window register 41 is collectively read from the window system 33 in step S 25. Then, in step S 26, the representation format of the information is converted to the text format. In step S 27, the window management information converted to the text representation format is stored in a value memory 46, and displayed on the display screen through a value input/output interface 45.

FIG. 10 is a detailed flowchart for explaining the writing process. When the process is started as shown in FIG. 10, the window management information in the text representation format is read from the value memory 46 in step S 30. In step S 31, the representation format of the window management information is returned to that of the original window system. In step S 32, the window management information is collectively written to the window having the window identifier corresponding to the content of the window register 41.

Figure 11A:
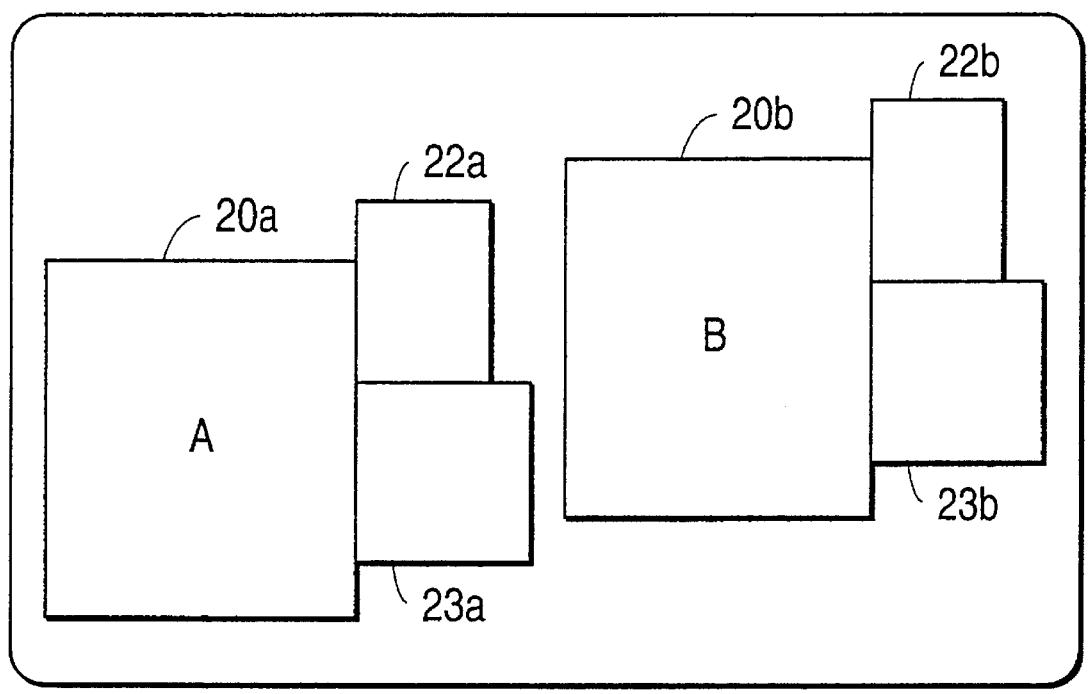
FIGS. 11A and 11B show examples of displays in which two window management information input/output systems are activated.
Figure 11B:
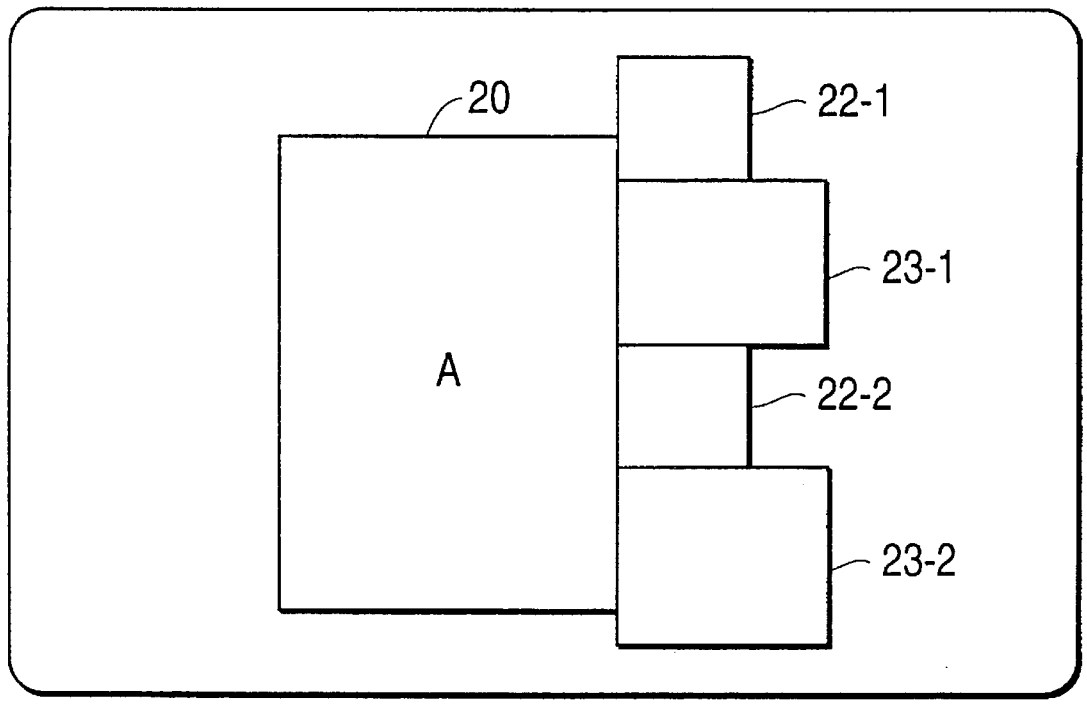

In the present invention, the window management information input/output system is activated by a command. In FIG. 3, a plurality of application programs can be simultaneously activated. Likewise, a plurality of window management information input/output system 10 can be simultaneously activated. Therefore, as shown in FIGS. 11A and 11B, for example, a plurality of commands must be entered to activate a plurality of window management information input/output systems. Immediately after the activation, it is not certain to which window a display and input/output box corresponding to each window management information input/output system is assigned. However, one input/output unit can be assigned to one window as shown in FIG. 11A, and two input/output units can be assigned to one window as shown in FIG. 11B. However, in the latter case, the two window management information display and input/output boxes corresponding to respective window management information input/output systems do not overlap with each other.

The method of using the input/output box when two window management information input/output systems are assigned to one window as shown in FIG. 11B is explained below by referring to FIG. 12.

In FIG. 11B, the content of window A is read by operating in an operational instruction box for each of the window management information input/output systems. The position of the window A is assumed to be (400,400). At this time, the same window management information is stored in the two window management information input/output systems. That is, the position information of the window indicates (400,400) for both units.

Figure 12B:
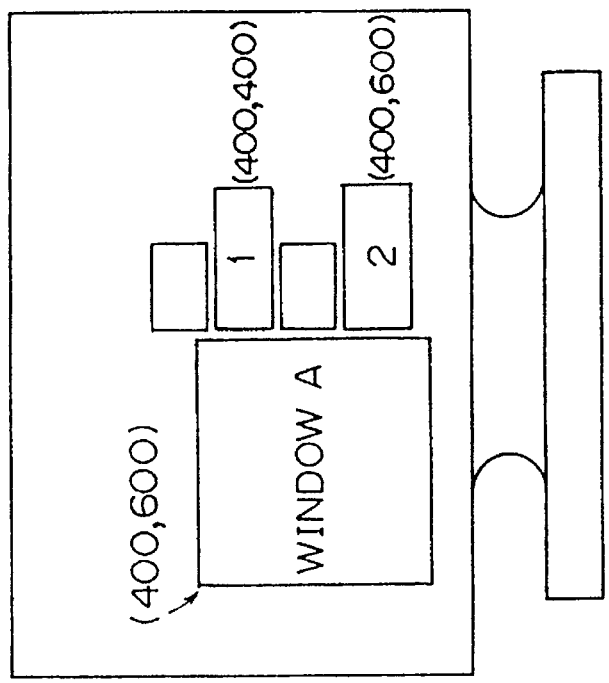
FIGS. 12A–12B show the method used when a window is provided with two window management information input/output systems.
Figure 12A:
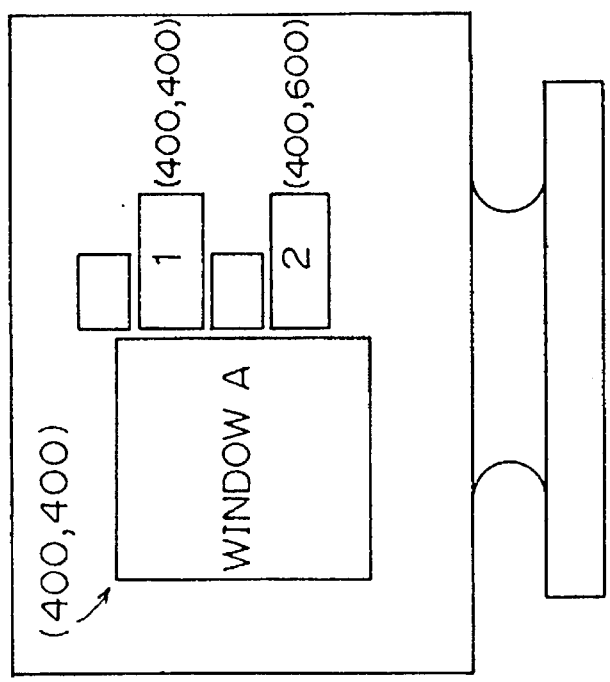

Now, the value display box of the lower window management information input/output system is modified by changing the position information to (400,600), while the window position information of the upper window management information input/output system is unchanged. This is shown in FIG. 12A.

Under this condition, the operational instruction box of the lower window management information input/output system is operated to write the window management information to window A. Then, the position of the window is moved to (400,600). This is shown in FIG. 12B.

Next, the operational instruction box of the upper window management information input/output system is operated to write the window management information to window A. Then, the window is returned to the position (400,400).

These processes can be alternately repeated to move the position of the window from (400,400) to (400,600) and vice versa.

That is, the two window management information input/output systems are provided with all position information for different windows, and the information can be set to any position through a simple operation.

Then, an embodiment of updating the value display box shown in FIG. 6 is explained below by referring to FIGS. 13A–13B. The content of the value display box shown in FIG. 13A is rewritten as shown in FIG. 13B by, for example, a user's operation through a keyboard. Next, the window size can be immediately changed to 400×462 by clicking the write button shown in FIG. 6. Simultaneously, the position of the origin, that is, the coordinates of the upper left corner of the window is changed to (20,20).

The window management information stored by the window system, etc. does not always have to coincide with the value indicated by the value input/output box 23, that is, the representation format in text for the information. The read button 51 and the write button 52 are provided to make them coincident. There are two ways of adjusting them, that is, either of them can be operated for a coincident result.

However, the reading and the writing processes must be collectively executed throughout all the management information. The reason for the necessity of a collective operation is explained below starting with the reading operation.

Assume a window is selected. On this window, one window management information input/output system is going to perform a collective reading, while another unit is going to write window management information to the same window. This process can be performed by a window manager, for example, and can be performed by one of the other window management input/output units if one window is assigned to a plurality of window managing input/output units as shown in FIG. 11B. Now, the position and the size of the window must be assumed for the information to be read.

Assuming that the present position of the window is (200,100) and its size 400×300, and they are being changed externally to the position (300,200) and the size 500×500. (The position (200,100) means that the position is set to 200 in the x coordinates and 100 in the y coordinates. The size 400×300 means that the size is set to 400 in width and 300 in height.) Now, a reading operation and a writing operation are requested almost at the same time.

A collective reading means that, once a reading operation is started, a writing operation must wait until the end of the reading operation even though the writing operation is requested immediately after the reading operation is requested. Otherwise, it means that if a reading operation is requested during a writing operation, the reading operation must wait until the end of the writing operation. Thus, the result of the reading operation can be either the position (200,100) and the size 400×300 or the position (300,200) and the size 500×500.

If a collective operation is not permitted, a reading operation and a writing operation can coexist. For example, when the reading operation is started first and reaches the position (200,100), the writing operation also starts and changes the position to (300,200) and the size to 500×500. At this time, the reading operation reads data for the size (500,500). As a result, actually impossible window management information of size 500×500 at position (200,100) is read. Therefore, the collective operation is required to prevent the above described false window management information from being read.

Next, the necessity of a collective writing operation is explained below.

Assume that the window is positioned at (200,100) for the size 400×300. A reading operation changes the position to (300,200) and the size to 500×500.

A collective writing operation means that the position and the size information (as well as other window management information) is completely written, and the effect of the information is simultaneously reflected in the present state of the window. This process guarantees a simultaneous change of the position and the size of a window on a physical screen unit.

Without the collective operation, an operation being processed is shown on the physical screen. In the example above, the position of the window is changed from (200,100) to (300,200) first when the position is written, and then the size of the window is changed to 400×300 to 500×500. That is, the intermediate result of the window at the position (300,200) for the size 400×300 is viewed.

FIGS. 14A, 14B, 14C, 14D, 15A, 15B, 15C and 16A, 16B, 16C, 16D, 16E show examples of the variations of a window management information display and input/output box according to an embodiment of the present invention.

Figure 14A:
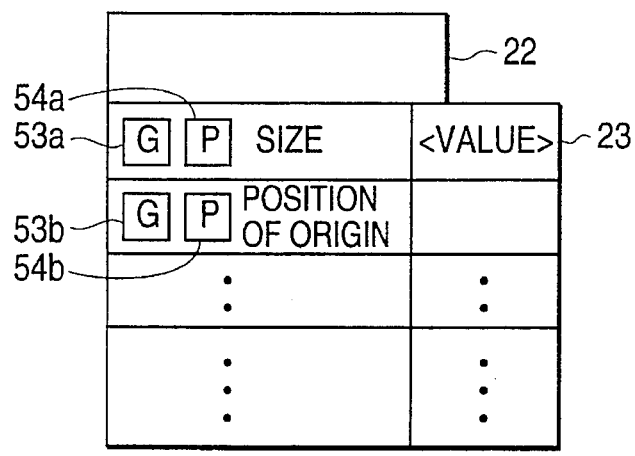
FIGS. 14A, 14B, 14C and 14D show an example of modifying the display and input/output box (1)

In the example shown in FIG. 14A, each of the value fields in the value display box 23 is provided with a read button 53a or 53b and a write button 54a or 54b. Clicking these buttons using a mouse reads or writes the window management information for each field separately.

When each value can be read or written for each field, the above described problem cannot arise, thereby requiring no collective operations.

Figure 14B:
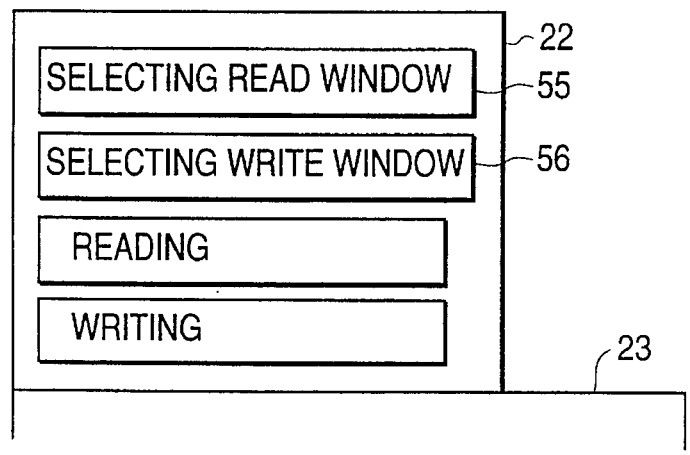

In the example shown in FIG. 14B, a read window selection button 55 and a write window selection button 56 are provided so that a read-from window and a write-to window can be separately selected.

Figure 14C:
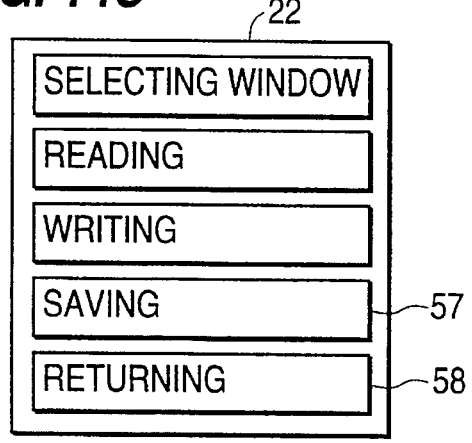

In the example shown in FIG. 14C, a save button 57 and a return button 58 are provided. When the save button is operated, the value in the value display box 23 is saved in a predetermined file. Operating the return button 58 reads the window management information saved in the file. A user optionally refers to or updates the value of the window management information saved in the file.

Using these buttons, the content of the file saved by the save button 57 is edited by a common text editor and obtained by the return button 58. Therefore, a user can edit the values in the value display box 23 under his/her own environment.

Figure 14D:
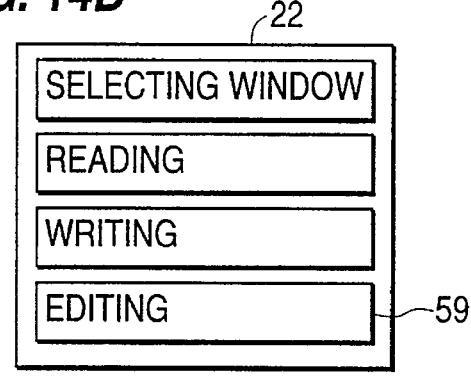

In the example shown in FIG. 14D, an edit button 59 is provided. The edit button 59 has the functions of the above described save button 57 and return button 58. Only pressing the edit button 59 saves data, activates a predetermined editor, and reads the data.

Figure 15A:
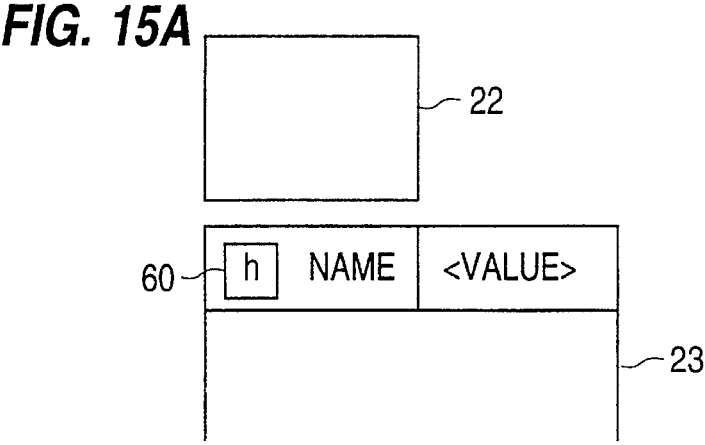
FIGS. 15A, 15B and 15C show an example of modifying the display and input/output box (2)
Figure 15B:
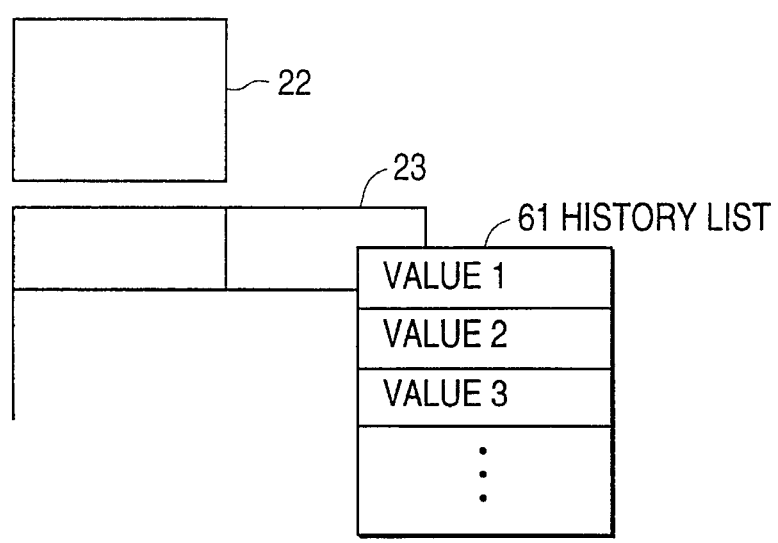

In the example shown in FIG. 15A, a history display button 60 is provided in each value field in the value display box 23. Pressing the history display button 60 temporarily displays a history list 61 as shown in FIG. 15B. The history list 61 lists the values that were inputted to the value field. One of them can be selected by the mouse operation as a new field value. In the history list 61, data can be displayed in several ways selectively, for example, in the ascending or the descending order of occurrence, in the alphabetical order, etc.

Figure 15C:
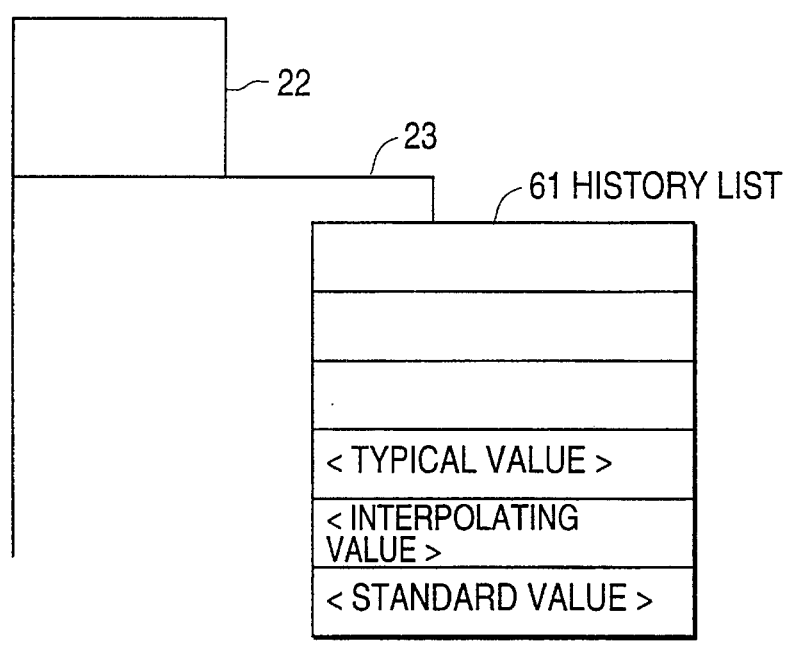

As shown in FIG. 15C, a typical value (obtained by calculating an average value, etc.), an interpolation value (for example, 2 to be complemented when 1, 3, and 4 are recorded as having occurred), a standard value (for example, the size of B5 and A4 for the field of a window size) as well as the values which appeared before can also be displayed together.

Figure 16A:
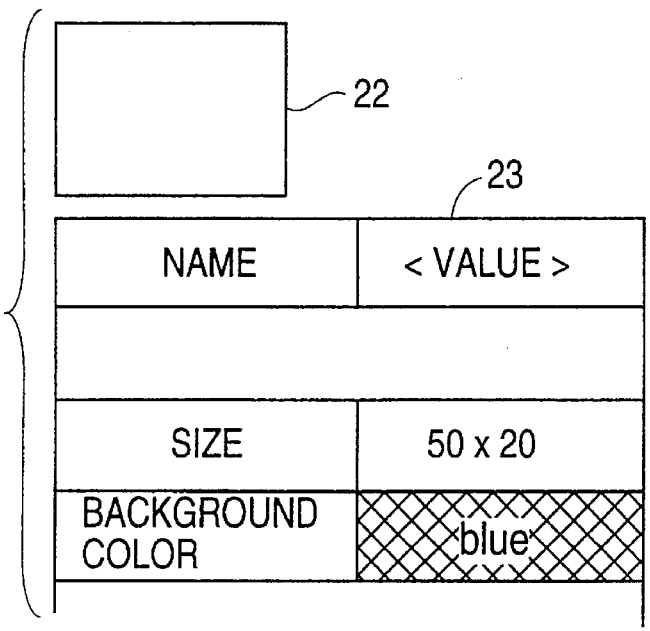
FIGS. 16A, 16B, 16C, 16D and 16E show an example of modifying the display and input/output box (3)

As shown in FIG. 16A, a value in the value display box 23 can be displayed not only by a text representation, but by other representation and in combinations of two representation formats. For example, the text representation (blue) and the blue color (indicated by diagonal checkerboard lines) are used to display a background color.

Figure 16B:
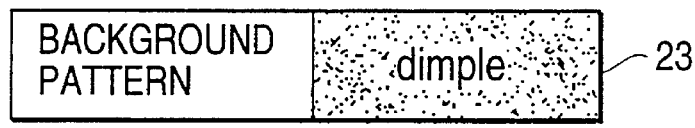

In the example shown in FIG. 16B, the text representation (dimple) and an actual pattern are combined to show a background pattern.

Figure 16C:
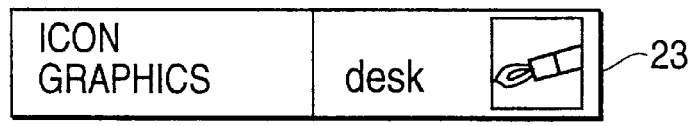

In the example shown in FIG. 16C, icon graphics can be displayed in the text representation (desk) and a picture. When it is specified and clicked by a mouse operation, a window is opened and temporarily displays a picture.

Figure 16D:
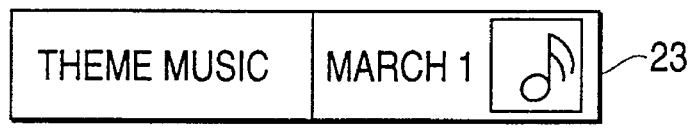

In the example shown in FIG. 16D, a theme music is displayed using the text representation (march 1) and a picture of a musical note. When the picture of the note is clicked, theme music is replayed.

The above described variations can be adopted simultaneously. However, in this case, too many options require too large a box or give too complicated an appearance.

Figure 16E:
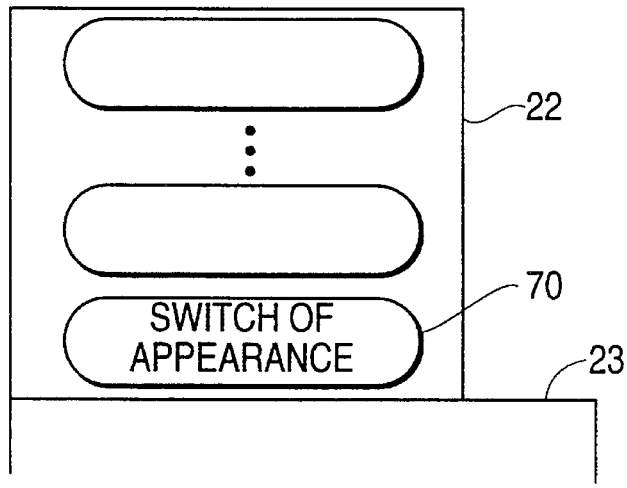

Therefore, in the example shown in FIG. 16E, the operational instruction box 22 is provided with an appearance switch button 70. Clicking the appearance switch button 70 displays a menu for separately specifying or removing the above variations. Thus, the appearance and the function of the window management information display and input/output box 21 can be customized according to each user.

In the present invention, the window management information input/output system can be used by other programs as well as by a user. Accessing from a program depends on the operating system of the program and the window system being used. Therefore, it is difficult to generally describe the usage of the present invention, and thus an embodiment is explained below by referring to FIG. 17.

Practically, an operational command is defined in addition to a command for activating the window management information input/output system. The present invention is applied to an operation system capable of optionally combining standard inputs and outputs among programs. For example, the pipe mechanism of the UNIX operating system meets the requirement.

When a command for activating a window management information input/output system is entered, the identifier is returned to identify this system, and is stored in a variable. Hereafter, specifying the identifier enables the window management information input/output system to be externally operated from a distance. Practically, the identifier must be specified as an essential argument in issuing an operational command.

The operational command uses as the first argument the identifier of the window management information input/output system to be controlled, and uses as the second argument a statement to indicate what control should be made.

A "Select" statement stores a specified window id in the window register of the window management information input/output system. A "Get" statement collectively reads the window management information of the window specified by the window register to a value display box. At this time, the internal representation format of the window system is converted to text format. A "Put" statement collectively writes the window management information stored by the value display box to the window specified by the window register. At this time, the text representation format is converted to the internal format of the window system. An "Output" command writes the content of the value display box to the standard output. At this time, each field is written as a pair given its name and value. An example is shown in FIG. 17A. An "Input" command reads the sequence of a field name and value in a pair from the standard input, and replaces the content of the field corresponding to the field name with the specified item.

A program as a user receives the sequence of the field name and value in a pair from the standard input, processes it, and prepares an object to be written as a standard output. Such a program is called a filter program; this is a common programming style under UNIX.

FIG. 17B shows an example of an operation of a window from a program using an activate command "StartRV" and an operational command "ControlRV".

When the activate command for activating a window management information input/output system is entered, the identifier for identifying the unit is returned and stored in a variable (FIG. 17B(1)). In response to the operational command "Select", a specified window is accessed (FIG. 17B(2)). In response to the operational command "Get", window management information is read from the specified window (FIG. 17B(3))

Then, the operational command "Output", a filter program, and the operational command "Input" are activated simultaneously. At this time, the standard output from the operational command "Output" is connected to the standard input to the filter program, and the standard output from the filter program is connected to the standard input to the operational command "Input" (FIG. 17B(4)).

The filter program reads a field name and a value pair, and optionally processes it. FIG. 17C shows an example in which the filter program shifts the position of the window to the right by 100 and downwards by 100. To attain this, the field name "window position" must be located to add 100 to each of the x and y coordinates. If the values are (200,100) for example, they must be corrected to (300,200) and written again with the field name as a pair. Thus, according to these three commands, the window management information stored in the value display box can be modified as if it were directly modified through a mouse or a keyboard.

Finally, the operational command "Put" is entered to write the window management information to the specified window (FIG. 17B(5)). If a given filter program is used based on the result of this command, the position of the window is shifted to right by 100 and downward by 100.

Through a series of operations above, the window can be operated from a program via the window management information input/output system.

As described above, the present invention enables window management information to be referred to or updated in a representation format comprehensible for a user, thereby improving the operability of a data processing unit having the function of displaying a window on the screen.

The present invention can be used in any field in industry where data processing units having the function of displaying a window on the screen are used.

What is claimed is:

1. A window management information input/output unit used in a window-based data processing system having a function of displaying on a screen of a display a window controlled by a window system and a window manager, said window system having a plurality of windows, said window management input/output unit coexisting with said window manager and comprising:

window selecting means for selecting an arbitrary on-the-screen window corresponding to window management information to be accessed by a user, window-management-information-providing means for inputting to and outputting from said display, window management information in a representation format comprehensible to a user;

window-management-information-reading means for reading window management information from said window system for said window selected by said window selecting means, converting the representation format of said window management information to generate a result in a representation format for said window-management-information-providing means, and outputting the result to said window-management-information-providing means; and window-management-information-writing means for converting said window management information output from said window-management-information-providing means to the original representation format in said window system to generate an output result, and outputting the output result to said window system as window management information for said selected window, said window management information input/output unit, independently of said window system, handling specified window management information and establishing window management information, by using window management information read from a first arbitrarily selected window, for a second arbitrarily selected window.

2. The window management information input/output unit according to claim 1, wherein said window management information includes attribute information;

a window management information display and input/output box is displayed on said display screen, said window management information display and input/output box having a value display box and an operational instruction box, said value display box displaying selected attribute information of said window management information, and accepting and displaying updates, by said user, of said window display management information, and said operational instruction box displaying a menu of operational instructions and accepting operational instructions selected by said user;

said window-management-information-providing means comprises:

window-management-information-storing means for temporarily storing said window management information in a representation format comprehensible to a user, and input/output means for inputting/outputting said window management information between said window-management-information storing means and said window management information display and input/output box, and, for accepting an update of said window management information by a user and outputting said window management information, updated by said user, to said window-management-information-storing means;

said window-management-information-reading means comprises reading means and representation-format-converting means for converting the representation format of said window management information read from said window system to a representation format comprehensible by the user; and said window-management-information-writing means comprises writing means and representation-format-converting means for converting the representation format of said window management information output from said window-management-information-providing means to the representation format of said window system.

3. The window management information input/output unit according to claim 1, wherein said window-management-information-reading means and said window-management-information-writing means collectively read or write, between said window system and said window-management-information-providing means, plural pieces of window management information for said selected window.

4. The window management information input/output unit according to claim 2, wherein said data processing unit includes at least one of a window management information input/output means, an operating system, a window manager, and at least one application program; and said display means for said window-based data processing system includes mouse means and keyboard means for accepting said operational instructions from said user and said updates of window management information through said window management information display and input/output box displayed on the display.

5. The window management information input/output unit according to claim 2, wherein said window-based data processing system includes more than one window management information input/output means; and each of said window management information input/output means includes:

at least one of said window-management-information-storing means, having a value memory means;

at least one of said window selecting means which comprises window selecting function means, said window selecting function means selecting a window from said window system according to a user's instruction and extracting an identifier of said window;

at least one of said input/output means which comprises operational panel interface means for receiving said operational instructions from said user through said window management information display and input/output box on said display screen, said value memory means for storing window management information values, and value input/output interface means for inputting/outputting one of said window management information values between said value memory means and said window management information display and input/output box;

at least one of said window-management-information-reading means which comprises reading function means for reading window management information from said value memory means;

at least one of said window-management-information-writing means which comprises writing function means for outputting said read information to said window system; and window register means for storing said identifier of said window extracted by said window selecting function means.

6. The window management information input/output unit according to claim 5, wherein in normal operation of said window-based data processing system, said window management information input/output system is activated by a command performed by said window-based data processing system, said operational instruction box and value display box are displayed on said display screen as said window management information display and input/output box, said operational instruction is expected from a user through said operational instruction box, when said instruction is received, determination is made as to whether or not said operational instruction specifies that a window must be selected, and, if not, the processes beginning from the step of waiting for an operational instruction from a user are repeated, if said operational instruction specifies that a window must be selected, said window selecting-function means performs a window selecting process, another operational instruction is expected from a user through said operational instruction box, when an operational instruction is received, determination is made as to whether or not said operational instruction specifies a read, and, if not, determination is made as to whether or not said instruction specifies that a window must be selected, and, if not, the processes from the step of waiting for a user's instruction after said window selecting process are repeated, when said instruction specifies that a window must be selected, said window selecting function means performs a window selecting process, and the processes from the step of waiting a user's instruction after said window selecting process are repeated, when said instruction specifies a read, said reading function means performs a reading process, another operational instruction is expected from a user through said operational instruction box, when an instruction is received, determination is made as to whether or not said instruction specifies a write, if not, determination is made as to whether or not said instruction specifies a read, and, if not, determination is made as to whether or not said instruction specifies that a window must be selected, and, if not, the processes from the step of waiting for a user's instruction after said read in process are repeated, if said instruction specifies that a window must be selected, said window selecting function means performs a window selecting process, and the processes from the step of waiting for a user's instruction after said reading process are repeated, if said instruction specifies a read, said reading function means performs a reading process, and the processes from the step of waiting for a user's instruction after said reading process are repeated, and if said instruction specifies a write, said writing function means performs a writing process, and the processes from the step of waiting for a user's instruction after said reading process are repeated.

7. The window management information input/output unit according to claim 6, wherein in said window selecting process, a user selects a window using a mouse and a keyboard, the identifier of said selected window is recorded in said window register, and a window management information display and input/output box is positioned in proximity to said selected window, such that said window management information display and I/O box does not overlap with another window management information display and input/output box corresponding to another window management information input/output unit associated with said window.

8. The window management information input/output unit according to claim 6, wherein in said reading process, the window management information for the window pointed to be a window identifier in said window register is collectively read from said window system, said read window management information is converted to a text representation, said window management information converted to said text representation is stored in a value memory and displayed in said window management information display and input/output box on said window screen.

9. The window management information input/output unit according to claim 6, wherein in said writing process, the window management information for the window pointed to by an identifier in said window register is read from said value memory, said window management information in said text representation is returned to the representation format in a window system, as the window management information for the window pointed to by said window identifier, said window management information returned to its original representation format is collectively written to said window system.

10. The window management information input/output unit according to claim 2, wherein in said window-based data processing system having two or more window management information input/output units, two or more window management information input/output units are activated, each of said activated window management information input/output units is associated with a different window, said window management information display and input/output box corresponding to each of said window management information input/output units is positioned close to said assigned window.

11. The window management information input/output unit according to claim 2, wherein in said window-based data processing system having two or more window management information input/output units, two or more window management information input/output units are activated, all of said two or more window management information input/output units are associated with one window, the window management information display and input/output box corresponding to each of said window management information input/output units is positioned close to said associated window such that it does not overlap with another box.

12. The window management information input/output unit according to claim 2, wherein
each of a plurality of items in said window management information displayed in said window management information display and input/output box on said display screen is separately read or written by a read instruction button and a write instruction button.

13. The window management information input/output unit according to claim 2, wherein
a read window selection button and a write window selection button are provided in said window management information display and input/output box on said display screen, and separately select a read destination and a write destination of window management information respectively.

14. The window management information input/output unit according to claim 2, wherein
a save button for saving in a predetermined file the content of the displayed window management information and a return button for reading the content of the window management information referred to or modified in said file are provided in said window management information display and input/output box on said display screen.

15. The window management information input/output unit according to claim 2, wherein
an edit button is provided in said window management information display and input/output box on said display screen which saves the displayed window management information, activates a predetermined editor for said saved window management information, and reads and returns said window management information on completion of an editing operation by said editor.

16. The window management information input/output unit according to claim 2, wherein
a history display button is provided for an item in the window management information displayed in said window management information display and input/output box on said display screen, and displays a history list which lists values inputted before as the value for said item.

17. The window management information input/output unit according to claim 2, wherein
an appearance switch button is provided in an operational instruction box in said window management information display and input/output box on said display screen, and selects an appearance from a menu indicating various appearances of said window management information.

18. The window management information input/output unit according to claim 1, further comprising an external interface which accepts:
an activate command of a first type which returns an operational command specifying an identifier of said window management information input/output unit;
an activate command of a second type which returns an operational command which selects a window using said window selecting means of said window management input/output unit identified by said identifier;
an activate command of a third type which returns an operational command which reads window management information from the selected window using said window-management input/output unit identified by said identifier;
an activate command of a fourth type which returns an operational command which writes window management information to the selected window using said window-management-information-writing means of said window management input/output unit identified by said identifier;
an activate command of a fifth type which returns an operational command which inputs window management information from outside via said external interface and puts it in said window-management input/output unit identified by said identifier; and
an activate command of a sixth type which returns an operational command which outputs window management information from said window-management-information-providing means of said window management input/output unit identified by said identifier and writes it outside via said external interference.

19. A method of managing window management information of windows in a window-based data processing system, comprising the steps of:
(a) providing an operational instruction box including a selecting window button, a reading button and a writing button, in association with a value display box, said value display box including at least one of size and position-of-origin in correspondence with a selected window and a set of operation steps (b)–(d), each operation step being activated at anytime during operation and in any order, after initialization has occurred by performing step (b) at least once and performing step (c) at least once after step (b) has been performed;
(b) selecting a new window as said selected window by activating said selecting window button using a cursor;
(c) reading the window management information of said selected window from said window-based data processing system, by activating said reading button using a cursor, including the at least one of corresponding size and position-of-origin and displaying the window management information on said value display box; and
(d) writing the window management information of said selected window to said window-based data processing system, by activating said writing button using a cursor, including the at least one of corresponding size and position-of-origin, which is stored in said value display box.

20. A device for managing window management information of windows in a window-based data processing system, comprising:
an operational instruction box including a selecting window button, a reading button and a writing button, in association with a value display box, said value display box including at least one of size and position-of-origin in correspondence with a selected window; and
operation means comprising:
means for selecting a new window as said selected window by activating said selecting window button by using a cursor;
means for reading the window management information of said selected window from said window-based data processing system, by activating said reading button by using a cursor, including the at least one of corresponding size and position-of-origin and displaying the window management information on said value display box; and
means for writing the window management information of said selected window to said window-based data processing system, by activating said writing button by using a cursor, including the at least one of corresponding size and position-of-origin which is stored in said value display box, each of said means for selecting, reading and writing being activated at anytime during operation and in any order after initialization has occurred by executing said means for selecting at least one time before executing said means for reading and executing said means for reading at least one time before executing said means for writing.

* * * * *